(12) United States Patent
Ueki

(10) Patent No.: US 11,325,205 B2
(45) Date of Patent: May 10, 2022

(54) LASER PROCESSING METHOD

(71) Applicant: DISCO CORPORATION, Tokyo (JP)

(72) Inventor: Atsushi Ueki, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 317 days.

(21) Appl. No.: 16/816,954

(22) Filed: Mar. 12, 2020

(65) Prior Publication Data

US 2020/0306877 A1  Oct. 1, 2020

(30) Foreign Application Priority Data

Mar. 29, 2019 (JP) .............................. JP2019-066726

(51) Int. Cl.
| | |
|---|---|
| *B23K 26/03* | (2006.01) |
| *B23K 26/04* | (2014.01) |
| *B23K 26/042* | (2014.01) |
| *B23K 101/40* | (2006.01) |

(52) U.S. Cl.
CPC ............ *B23K 26/03* (2013.01); *B23K 26/042* (2015.10); *B23K 26/048* (2013.01); *B23K 2101/40* (2018.08)

(58) Field of Classification Search
CPC .. B23K 26/042; B23K 26/03; B23K 2103/56; B23K 26/048; B23K 26/53
See application file for complete search history.

(56) References Cited

FOREIGN PATENT DOCUMENTS

| | | |
|---|---|---|
| JP | 2010048715 A | 3/2010 |
| JP | 2011143488 A | 7/2011 |
| JP | 2011151299 A | 8/2011 |
| JP | 2018063148 A | 4/2018 |

*Primary Examiner* — Dana Ross
*Assistant Examiner* — Kuangyue Chen
(74) *Attorney, Agent, or Firm* — Greer Burns & Crain Ltd.

(57) ABSTRACT

In a laser processing apparatus, a height of a focusing lens in a processing unit can be changed according to a change in height of an upper surface of a wafer, thereby changing a vertical position of a focal point of a laser beam inside the wafer. Accordingly, the laser beam can be applied to the wafer as feeding the wafer in a condition where the focal point is set at a vertical position spaced a fixed distance from the lower surface of the wafer. As a result, a modified layer can be formed inside the wafer at a uniform height from the lower surface of the wafer.

3 Claims, 8 Drawing Sheets

FIG. 9

| sin θ f(n=3.7) | | 0.934 | 0.919 | 0.902 | 0.885 | 0.864 | 0.841 | 0.829 | 0.817 | 0.789 | 0.758 | 0.724 | 0.686 |
|---|---|---|---|---|---|---|---|---|---|---|---|---|---|
| | N | 0.1 | 0.11 | 0.12 | 0.13 | 0.14 | 0.15 | 0.155 | 0.16 | 0.17 | 0.18 | 0.19 | 0.2 |
| DF=-14 | t=100 | 48.252 | 48.356 | 48.928 | 47.708 | 48.408 | 45.38 | 45.714 | 45.406 | 47.728 | 46.48 | 46.992 | 48.602 |
| | t=90 | 46.542 | 45.702 | 48.386 | 48.058 | 47.614 | 45.244 | 47.302 | 46.69 | 48.656 | 46.762 | 50.544 | 52.576 |
| DF=-16 | t=100 | 40.374 | 38.798 | 38.37 | 38.322 | 38.22 | 37.58 | 37.13 | 37.636 | 38.864 | 38.67 | 37.908 | 39.606 |
| | t=90 | 39.372 | 36.462 | 37.232 | 38.032 | 38.22 | 37.278 | 39.642 | 38.334 | 39.25 | 40.6 | 44.038 | 45.928 |
| DF=-18 | t=100 | 30.674 | 26.898 | 30.392 | 28.058 | 28.418 | 27.852 | 27.192 | 28.428 | 30.02 | 30.96 | 29.104 | 30.486 |
| | t=90 | 30.394 | 24.59 | 29.998 | 28.472 | 28.772 | 28.254 | 28.448 | 30.03 | 30.672 | 33.63 | 33.762 | 35.638 |
| DF=-20 | t=100 | 20.994 | 19.434 | 18.84 | 20.1 | 19.284 | 19.834 | 19.262 | 18.918 | 20.896 | 21.772 | 21.28 | 20.626 |
| | t=90 | 20.07 | 17 | 19.406 | 20.516 | 18.708 | 20.726 | 19.698 | 19.73 | 21.22 | 22.98 | 23.83 | 25.038 |
| DF=-22 | t=100 | 12.758 | 12.532 | 9.706 | 11.382 | 8.448 | 10.364 | 10.092 | 8.778 | 11.312 | 11.696 | 11.174 | 11.274 |
| | t=90 | 11.39 | 9.354 | 10.374 | 12.742 | 8.96 | 10.83 | 10.362 | 10.942 | 10.932 | 13.686 | 15.052 | 17.878 |

LASER PROCESSING METHOD

BACKGROUND OF THE INVENTION

Field of the Invention

The present invention relates to a laser processing method.

Description of the Related Art

In forming a plurality of chips, a plurality of devices are first formed on the front side of a wafer in a plurality of separate regions defined by a plurality of division lines. Thereafter, the wafer is divided along these division lines to obtain the plural chips respectively including the plural devices. In dividing the wafer, a protective tape is attached to the front side of the wafer, and a laser beam is applied to the back side of the wafer in the condition where the focal point of the laser beam is set inside the wafer. At the same time, the focal point of the laser beam is relatively moved with respect to the wafer along each division line, thereby forming a modified layer inside the wafer along each division line. Thereafter, an external force is applied to each modified layer, thereby dividing the wafer along all the division lines to obtain the individual chips.

SUMMARY OF THE INVENTION

However, in dividing the wafer along each modified layer to obtain the chips, there is a case that a side edge of each chip is less prone to become straight. This may be due to the fact that the modified layer is not formed at a uniform height from the front side (lower surface) of the wafer, so that the external force applied to each modified layer tends to become nonuniform.

In feeding the wafer in the condition where the focal point of the laser beam is set at a fixed height, so as to form each modified layer, it is considered that the modified layer is not formed at a uniform height from the lower surface of the wafer held on a chuck table because of variations in thickness of the wafer, variations in height of the upper surface of the chuck table, and/or variations in thickness of the protective tape attached to the lower surface of the wafer.

It is therefore an object of the present invention to provide a laser processing method which can form a modified layer inside a wafer at a uniform height from the lower surface of the wafer.

In accordance with an aspect of the present invention, there is provided a laser processing method of forming a modified layer inside a plate-shaped workpiece by applying a laser beam having a transmission wavelength to the workpiece in the condition where the focal point of the laser beam is set inside the workpiece and relatively moving the focal point of the laser beam with respect to the wafer along a division line preset on the workpiece, the laser processing method including a holding step of holding the workpiece on a chuck table; an upper surface height measuring step of measuring the height of the upper surface of the workpiece held on the chuck table; a thickness measuring step of measuring the thickness of the workpiece held on the chuck table at a measurement position where the upper surface height measuring step is performed; a lower surface height calculating step of calculating the height of the lower surface of the workpiece held on the chuck table according to the height measured in the upper surface height measuring step and the thickness measured in the thickness measuring step; a correction value calculating step of setting a first vertical position spaced upward from the lower surface of the workpiece by a predetermined distance according to the height calculated in the lower surface height calculating step, next calculating the distance from the first vertical position to the upper surface of the workpiece, and next dividing the distance calculated above by a value obtained by adding a predetermined coefficient to the refractive index of the workpiece, thereby calculating a correction value for correcting the vertical position of focusing means for applying the laser beam so that the focal point is set at the first vertical position; and a modified layer forming step of feeding the workpiece and applying the laser beam from the focusing means as correcting the vertical position of the focusing means according to the correction value, thereby forming the modified layer along the division line at the first vertical position constant from the lower surface of the workpiece.

In accordance with another aspect of the present invention, there is provided a laser processing method of forming a modified layer inside a plate-shaped workpiece by applying a laser beam having a transmission wavelength to the workpiece in the condition where the focal point of the laser beam is set inside the workpiece and relatively moving the focal point of the laser beam with respect to the wafer along a division line preset on the workpiece, the laser processing method including a holding step of holding the workpiece on a chuck table; a reference upper surface height storing step of measuring the height of the upper surface of the workpiece held on the chuck table at a predetermined reference feed position by using upper surface height measuring means and next storing the height measured above as a reference upper surface height ($H0$); a reference thickness storing step of measuring the thickness of the workpiece held on the chuck table at the reference feed position by using thickness measuring means and next storing the thickness measured above as a reference thickness ($T0$); a reference focusing means height calculating step of calculating the height of focusing means for applying the laser beam as a reference focusing means height ($E0$) at the reference feed position according to the reference upper surface height ($H0$) stored in the reference upper surface height storing step and the reference thickness ($T0$) stored in the reference thickness storing step so that the focal point is set at a first vertical position spaced upward from the lower surface of the workpiece by a predetermined distance; a measuring step of measuring the height ($H$) of the upper surface of the workpiece and the thickness ($T$) of the workpiece as relatively moving the upper surface height measuring means and the thickness measuring means with respect to the workpiece along the division line by using feeding means; a height difference calculating step of subtracting the reference upper surface height ($H0$) from the height ($H$) measured in the measuring step to thereby calculate a height difference ($\Delta H$); a thickness difference calculating step of subtracting the reference thickness ($T0$) from the thickness ($T$) measured in the measuring step to thereby calculate a thickness difference ($\Delta T$); an adjustment value calculating step of using the height difference ($\Delta H$), the thickness difference ($\Delta T$), and a parameter ($N$) to calculate an adjustment value for vertically adjusting the height of the focusing means with respect to the reference focusing means height ($E0$) so that the focal point is set at the first vertical position, from Equation (1) depicted below; and a modified layer forming step of feeding the workpiece and applying the laser beam from the focusing means as vertically changing the height of the focusing means by a distance corresponding to the adjustment value, thereby forming the modified layer along the division line at the first vertical position constant from the lower surface of the workpiece; the adjustment value being given by:

$$\text{Adjustment value} = \text{height difference } (\Delta H) - \text{thickness difference } (\Delta T) \times \text{parameter } (N) \quad (1)$$

where N is given by:

$$N = \tan[\arcsin\{(1/n) \times \sin \theta f\}]/\tan \theta f + \alpha,$$

in which n is the refractive index of the workpiece, θf is the angle of incidence of the laser beam focused by the focusing means to enter the workpiece, and a is a predetermined value according to the material of the workpiece.

Preferably, the measuring step, the height difference calculating step, the thickness difference calculating step, the adjustment value calculating step, and the modified layer forming step are continuously performed along the division line.

According to the laser processing method of the present invention, the height of the focusing means can be changed according to a change in height of the upper surface of the workpiece. That is, the height of the focal point of the laser beam can be changed according to a change in height of the upper surface of the workpiece. Accordingly, the focal point can be set inside the workpiece at a vertical position spaced a fixed distance from the lower surface of the workpiece, so that the modified layer can be formed at this fixed vertical position inside the workpiece along each division line.

The above and other objects, features, and advantages of the present invention and the manner of realizing them will become more apparent, and the invention itself will best be understood from a study of the following description and appended claims with reference to the attached drawings showing a preferred embodiments of the invention.

BRIEF DESCRIPTION OF THE DRAWINGS

FIG. 9 is a table depicting the results of the test conducted.

DETAILED DESCRIPTION OF THE PREFERRED EMBODIMENTS

First Preferred Embodiment

Figure 1:
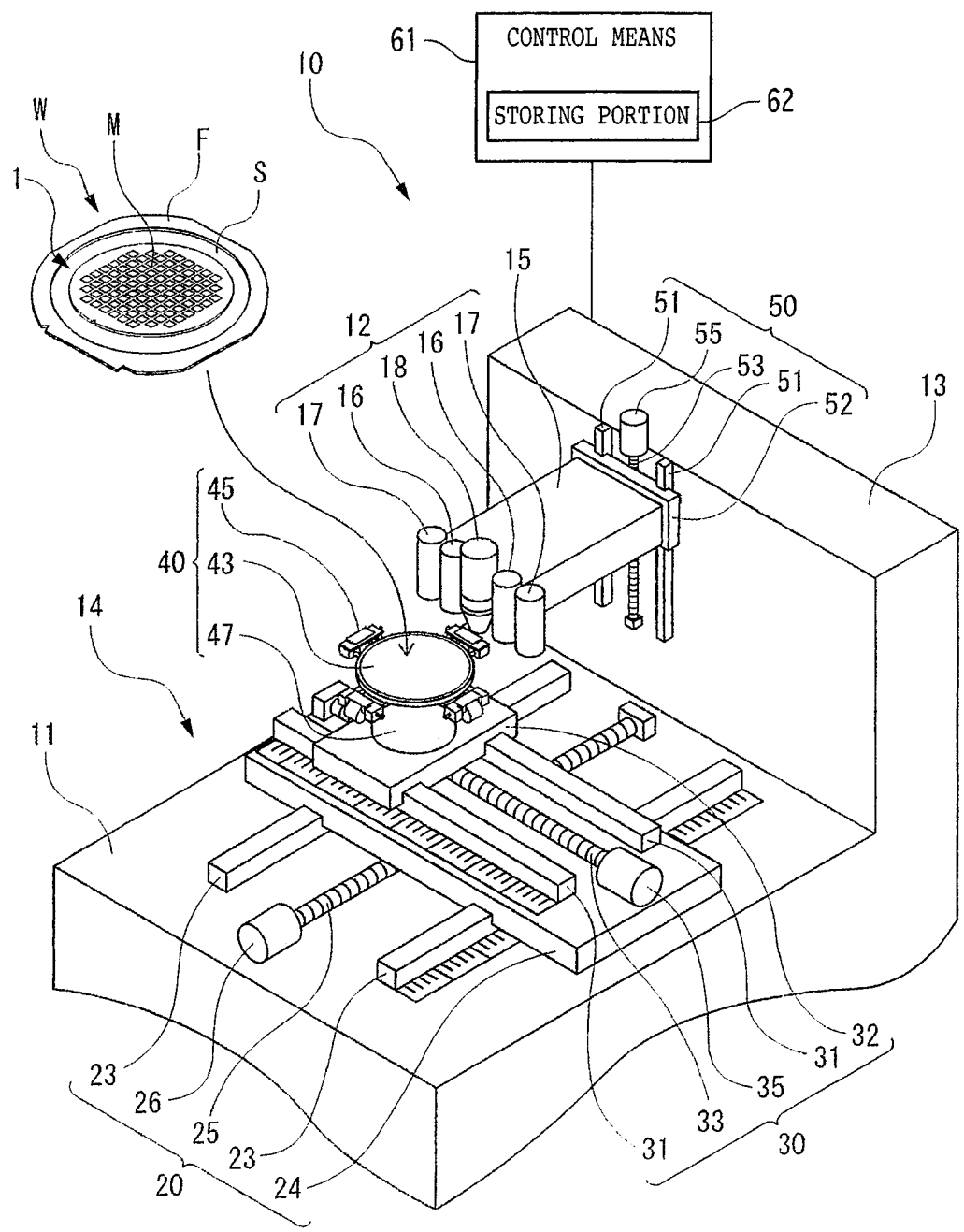
FIG. 1 is a perspective view depicting the configuration of a laser processing apparatus according to a preferred embodiment of the present invention.

Referring to FIG. 1, there is depicted a laser processing apparatus 10 according to a first preferred embodiment of the present invention. As depicted in FIG. 1, the laser processing apparatus 10 includes a box-shaped base 11 and an upright wall 13 formed at one end (rear end) of the base 11. A chuck table moving mechanism 14 for moving a chuck table 43 is provided on the upper surface of the base 11. The chuck table moving mechanism 14 functions to feed the chuck table 43 in the X direction depicted by an arrow X in FIG. 1 and also index the chuck table 43 in the Y direction depicted by an arrow Y in FIG. 1.

The chuck table moving mechanism 14 includes a chuck table portion 40 including the chuck table 43, an indexing portion 20 for moving the chuck table 43 in an indexing direction, and a feeding portion 30 for moving the chuck table 43 in a feeding direction.

The indexing portion 20 includes a pair of guide rails 23 extending in the Y direction, a Y table 24 mounted on the guide rails 23, a ball screw 25 extending parallel to the guide rails 23, and a drive motor 26 for rotating the ball screw 25.

The pair of guide rails 23 is provided on the upper surface of the base 11 so as to extend in the Y direction. The Y table 24 is slidably mounted on the pair of guide rails 23 so as to be movable in the Y direction along the guide rails 23. The feeding portion 30 and the chuck table portion 40 are mounted on the Y table 24.

The ball screw 25 is threadedly engaged with a nut portion (not depicted) formed on the lower surface of the Y table 24. The drive motor 26 is connected to one end of the ball screw 25, thereby rotationally driving the ball screw 25. Accordingly, when the ball screw 25 is rotated by the drive motor 26, all of the Y table 24, the feeding portion 30, and the chuck table portion 40 are moved together in the indexing direction (Y direction) along the guide rails 23.

The feeding portion 30 includes a pair of guide rails 31 extending in the X direction, an X table 32 mounted on the guide rails 31, a ball screw 33 extending parallel to the guide rails 31, and a drive motor 35 for rotating the ball screw 33. The pair of guide rails 31 is mounted on the upper surface of the Y table 24 so as to extend in the X direction. The X table 32 is slidably mounted on the pair of guide rails 31 so as to be movable in the X direction along the guide rails 31. The chuck table portion 40 is mounted on the X table 32.

The ball screw 33 is threadedly engaged with a nut portion (not depicted) formed on the lower surface of the X table 32. The drive motor 35 is connected to one end of the ball screw 33, thereby rotationally driving the ball screw 33. Accordingly, when the ball screw 33 is rotated by the drive motor 35, both the X table 32 and the chuck table portion 40 are moved together in the feeding direction (X direction) along the guide rails 31.

The chuck table portion 40 is used to hold a substantially circular wafer 1. As depicted in FIG. 1, the wafer 1 is held in the form of a wafer unit W by the chuck table portion 40, in which the wafer unit W includes a ring frame F and an adhesive tape S in addition to the wafer 1. That is, the wafer unit W is formed by supporting the wafer 1 through the adhesive tape S to the ring frame F. The wafer 1 has a plurality of crossing division lines M composed of a plurality of parallel division lines M extending in a first direction and a plurality of parallel division lines M extending in a second direction perpendicular to the first direction. The front side of the wafer 1 is partitioned by the crossing division lines M to define a plurality of separate regions, in which a plurality of devices (not depicted) are respectively formed. The wafer 1 thus having the plural devices is divided along the division lines M to thereby form a plurality of chips respectively including the plural devices.

The chuck table portion 40 has the above-mentioned chuck table 43 for holding the wafer 1, four clamp portions 45 provided on the outer circumference of the chuck table 43 so as to be arranged at equal intervals in the circumferential direction of the chuck table 43, and a θ table 47 supporting the chuck table 43.

The θ table 47 is provided on the upper surface of the X table 32 so as to be rotatable in an XY plane defined by the X direction and the Y direction. The chuck table 43 is a member for holding the wafer 1 under suction. The chuck table 43 is a disk-shaped member provided on the θ table 47.

The chuck table 43 has an upper surface on which a holding surface for holding the wafer 1 thereon is formed from porous ceramic. This holding surface is connected to a vacuum source (not depicted) for producing a vacuum. The four clamp portions 45 are respectively fixed through four support arms (not depicted) to the outer circumference of the chuck table 43. Each clamp portion 45 is adapted to be driven by an air actuator (not depicted) to hold the ring frame F supporting the wafer 1 held on the chuck table 43. Each clamp portion 45 is adapted to hold the ring frame F so as to sandwich both sides of the ring frame F.

The upright wall 13 of the laser processing apparatus 10 is provided on the rear side of the chuck table moving mechanism 14 in the Y direction. The upright wall 13 has a front surface on which elevating means 50 is provided. The elevating means 50 functions to vertically move a laser unit 12 in the Z direction depicted by an arrow Z in FIG. 1.

The elevating means 50 includes a pair of guide rails 51 extending in the Z direction, a Z table 52 mounted on the guide rails 51, a ball screw 53 extending parallel to the guide rails 51, and a drive motor 55 for rotating the ball screw 53. The pair of guide rails 51 is provided on the front surface of the upright wall 13 so as to extend in the Z direction. The Z table 52 is slidably mounted on the pair of guide rails 51 so as to be movable in the Z direction along the guide rails 51. The Z table 52 has a front surface on which an arm portion 15 supporting the laser unit 12 is mounted.

The ball screw 53 is threadedly engaged with a nut portion (not depicted) formed on the rear surface of the Z table 52 opposite to the above-mentioned front surface in the Y direction. The drive motor 55 is connected to the upper end of the ball screw 53, thereby rotationally driving the ball screw 53. Accordingly, when the ball screw 53 is rotated by the drive motor 55, all of the Z table 52, the arm portion 15, and the laser unit 12 are vertically moved together in the Z direction along the guide rails 51.

The arm portion 15 projects from the front surface of the Z table 52 to a position above the chuck table moving mechanism 14. The laser unit 12 is supported to the front end of the arm portion 15 so as to be opposed to the chuck table 43 of the chuck table portion 40.

The laser unit 12 is a unit laser-processing the wafer 1. The laser unit 12 includes processing means 18 for processing the wafer 1 held on the chuck table 43 by using a laser beam, a pair of thickness measuring means 16 provided so as to interpose the processing means 18, and a pair of upper surface height measuring means 17 provided so as to interpose the processing means 18 and the pair of thickness measuring means 16.

Each thickness measuring means 16 functions to measure the thickness of the wafer 1 held on the chuck table 43. Each upper surface height measuring means 17 functions to measure the upper surface height of the wafer 1 held on the chuck table 43. For example, the upper surface height of the wafer 1 means the height of the upper surface of the wafer 1 from the upper surface of the X table 32 or from the upper surface of the base 11.

For example, a thickness measuring apparatus and a height measuring apparatus using a technique disclosed in Japanese Patent Laid-Open No. 2011-143488, Japanese Patent Laid-Open No. 2011-151299, Japanese Patent Laid-Open No. 2018-063148, and Japanese Patent Laid-Open No. 2010-048715 may be used as each thickness measuring means 16 and each upper surface height measuring means 17, respectively.

Figure 2:
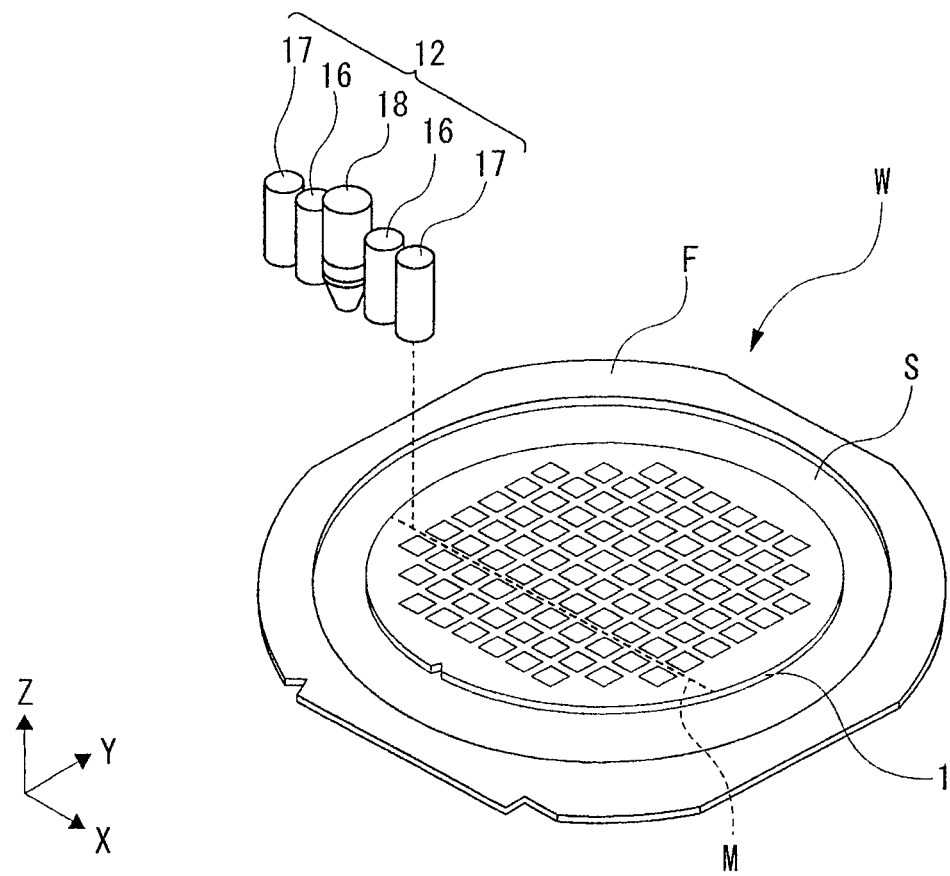
FIG. 2 is a perspective view depicting a wafer unit and a laser unit set in position above a division line in the wafer unit.

As depicted in FIG. 2, the laser unit 12 is relatively moved with respect to the wafer 1 of the wafer unit W in the X direction just over each division line M of the wafer 1 (along each division line M of the wafer 1). The wafer unit W is configured in such a manner that the back side (lower surface) of the wafer 1 is attached to a central portion of the adhesive tape (dicing tape) S and a peripheral portion of the adhesive tape S is attached to one side (lower surface) of the ring frame (annular frame) F. The processing means 18, the two thickness measuring means 16, and the two upper surface height measuring means 17 constituting the laser unit 12 are arranged in a line extending in the X direction in such a manner that the two thickness measuring means 16 are located adjacent to the processing means 18 on both sides thereof in the X direction and the two upper surface height measuring means 17 are located adjacent to the two thickness measuring means 16 on both sides thereof in the X direction. That is, in the direction of the relative movement of the laser unit 12, one of the two thickness measuring means 16 and one of the two upper surface height measuring means 17 are located on the downstream side of the processing means 18, and the other thickness measuring means 16 and the other upper surface height measuring means 17 are located on the upstream side of the processing means 18.

Figure 3:
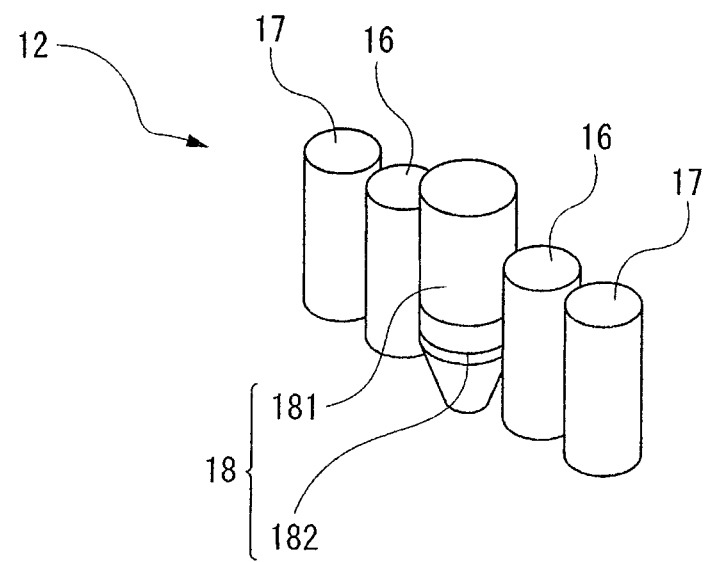
FIG. 3 is a perspective view depicting the configuration of the laser unit.

As depicted in FIG. 3, the processing means 18 of the laser unit 12 includes focusing means or condenser 181 and an actuator 182. The focusing means 181 includes a laser oscillator for generating a laser beam and a focusing lens for focusing the laser beam generated from the laser oscillator. The laser beam generated from the laser oscillator is focused inside the wafer 1 held on the chuck table 43. The actuator 182 functions to adjust the distance from the focusing means 181 to the wafer 1 held on the chuck table 43.

As depicted in FIG. 1, the laser processing apparatus 10 includes control means (controller) 61 for controlling each component of the laser processing apparatus 10. The control means 61 has a storing portion 62 for storing various programs and various kinds of data.

The laser processing operation of the laser processing apparatus 10 to the wafer 1 will now be described. In the operation of the laser processing apparatus 10 under the control by the control means 61, a laser beam having a transmission wavelength to the wafer 1 as a plate-shaped workpiece is applied to the wafer 1 in the condition where the focal point of the laser beam is set inside the wafer 1 and the focal point is relatively moved with respect to the wafer 1 along each division line M. That is, the laser beam is applied along each division line M so as to be focused inside the wafer 1. Accordingly, a modified layer is formed inside the wafer 1 along each division line M.

More specifically, the wafer 1 is first placed on the chuck table 43 of the chuck table portion 40 by an operator. The control means 61 controls the vacuum source to make the communication between the holding surface (upper surface) of the chuck table 43 and the vacuum source, thereby holding the wafer 1 on the chuck table 43 under suction. The control means 61 further controls the clamp portions 45 to hold the ring frame F supporting the wafer 1 through the adhesive tape S (holding step):

Thereafter, the control means 61 controls the laser unit 12 and the chuck table 43 to relatively move the laser unit 12 with respect to the wafer 1 and apply the laser beam to the wafer 1 along each division line M, thereby laser-processing the wafer 1.

In this laser processing, the control means 61 first controls the indexing portion 20 and the chuck table portion 40 so that a predetermined one of the division lines M extending in the first direction on the wafer 1 becomes parallel to the X direction, and one end of this predetermined division line M is positioned directly below the laser unit 12, that is, the thickness measuring means 16, the upper surface height measuring means 17, and the processing means 18 (alignment). Accordingly, the wafer 1 is to be processed along this predetermined division line M by the laser beam.

After performing the alignment mentioned above, the control means 61 controls the feeding portion 30 to feed the wafer 1 in the X direction. As a result, the laser unit 12 is relatively moved with respect to the wafer 1 held on the chuck table 43 in the +X direction depicted by an arrow A in FIG. 4.

Figure 4:
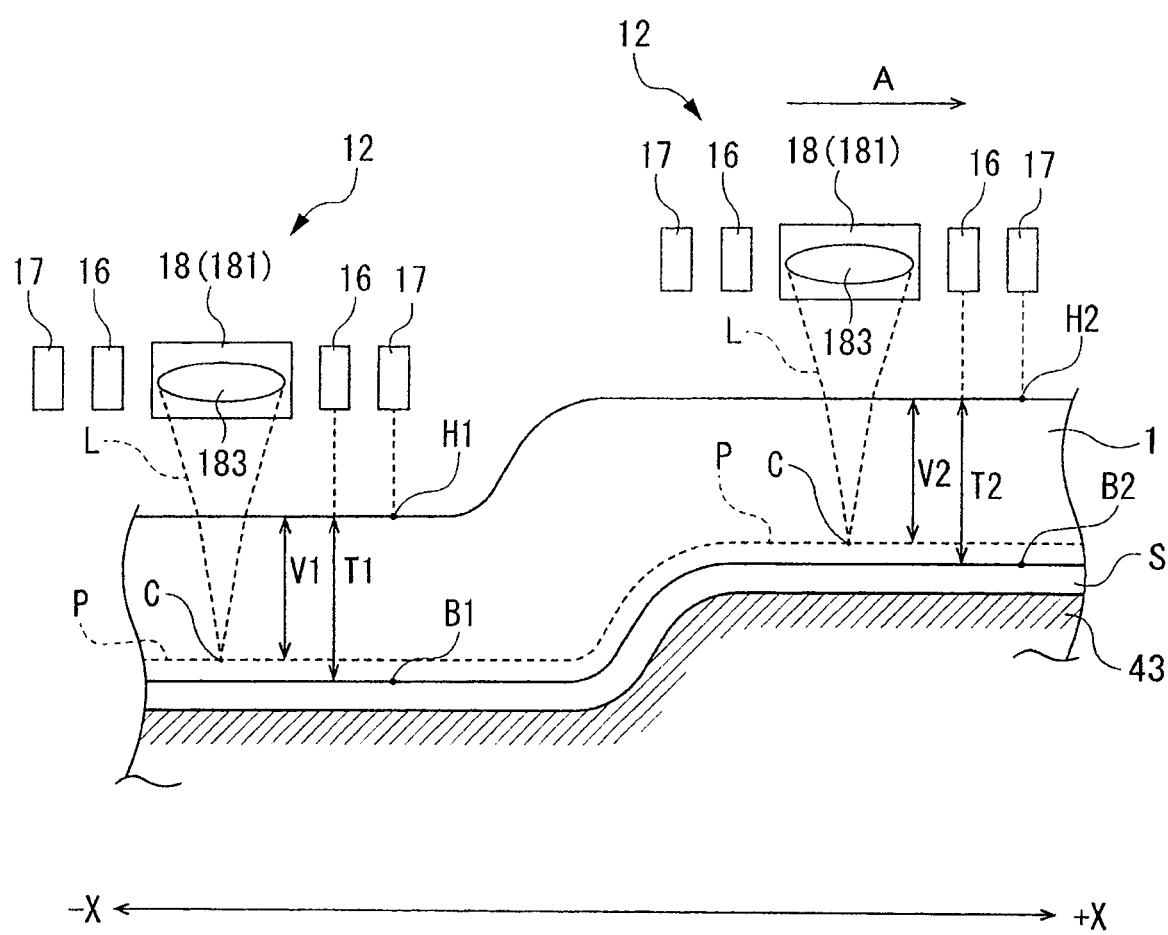
FIG. 4 is a schematic side view depicting a laser processing operation in the laser processing apparatus depicted in FIG. 1.

At this time, the control means 61 controls the vertical position of the focusing means 181 (focusing lens 183) in the processing means 18. More specifically, as depicted in FIG. 4, the control means 61 controls the upper surface height measuring means 17 located on the downstream side of the processing means 18 in the scanning direction A of the laser beam (i.e., in the direction of the relative movement of the laser unit 12) (i.e., in the +X direction), thereby measuring the upper surface height H1 of the wafer 1 (the predetermined division line M) at a position directly below the upper surface height measuring means 17 (upper surface height measuring step). Then, the control means 61 determines the vertical position of the focusing means 181 according to the upper surface height H1 measured above. Then, the control means 61 operates the actuator 182 (see FIG. 3) to set the actual vertical position of the focusing means 181 to the above-mentioned vertical position.

Further, the control means 61 determines a correction value for correcting the vertical position of the focusing means 181 in the following manner. More specifically, the control means 61 controls the thickness measuring means 16 located on the downstream side of the processing means 18 in the scanning direction A of the laser beam, thereby measuring the thickness T1 of the wafer 1 at the measurement position where the measurement by the upper surface height measuring means 17 mentioned above has been performed (thickness measuring step).

The measurement position mentioned above means a position in the direction of extension of the predetermined division line M, that is, in the feeding direction (X direction). In the following description, this position in the feeding direction (X direction) will be referred to as a feed position or an X position.

Thereafter, the control means 61 calculates the lower surface height B1 of the wafer 1 according to the upper surface height H1 measured in the upper surface height measuring step and the thickness T1 measured in the thickness measuring step (lower surface height calculating step).

Further, the control means 61 sets a first vertical position P raised from the lower surface of the wafer 1 by a predetermined distance according to the lower surface height B1 calculated in the lower surface height calculating step.

Thereafter, the control means 61 calculates the distance V1 from the first vertical position P to the upper surface of the wafer 1. Further, the control means 61 divides the distance V1 by a value obtained by adding a predetermined coefficient to the refractive index of the wafer 1, thereby calculating the correction value for correcting the vertical position of the focusing means 181 (focusing lens 183) so that a focal point C is set at this constant first vertical position P from the lower surface of the wafer 1 (correction value calculating step).

The elements of the coefficient in the "value obtained by adding a predetermined coefficient to the refractive index of the wafer 1" mentioned above include the numerical aperture (NA) of the focusing lens 183, the spherical aberration of the focusing lens 183, and the wavelength of the laser beam L. When these elements become larger, the focal length as the distance from the focusing lens 183 to the focal point C becomes larger.

Thereafter, the control means 61 corrects the vertical position of the focusing means 181 (focusing lens 183) in the processing means 18, i.e., the vertical position of the focal point C of the laser beam L, according to the correction value calculated above, by using the actuator 182 (see FIG. 3) in the processing means 18. At the same time, the laser beam L is scanned in the direction A. Accordingly, the focal point C of the laser beam L can be set at the constant first vertical position P from the lower surface of the wafer 1, and a modified layer can be formed at this focal point C (modified layer forming step).

There is a case that the upper surface height of the wafer 1 may change with a change in feed position during the feeding of the wafer 1. For example, as depicted in a right portion of FIG. 4, there is a case that the upper surface height of the chuck table 43 may increase to cause an increase in the upper surface height of the wafer 1.

Even in this case, the control means 61 sets the vertical position of the focusing means 181 according to the upper surface height H2 at this feed position depicted in the right portion of FIG. 4. That is, the control means 61 measures the thickness T2 of the wafer 1 and the upper surface height H2 of the wafer 1 at this feed position and calculates the lower surface height B2 of the wafer 1, thereby setting the first vertical position P at this feed position. Then, the control means 61 calculates the distance V2 from the first vertical position P to the upper surface of the wafer 1 and next divides the distance V2 by the value obtained by adding the predetermined coefficient to the refractive index of the wafer 1, thereby calculating a correction value. Thereafter, the control means 61 corrects the vertical position of the focusing means 181 in the processing means 18, i.e., the vertical position of the focal point C of the laser beam L, according to the correction value calculated above. Then, the laser beam L is scanned in the direction A.

In the case that the upper surface height of the chuck table 43 changes, but the thicknesses of the wafer 1 and the adhesive tape S do not change as depicted in FIG. 4, the distance V2 is substantially equal to the distance V1. Accordingly, in this case, the vertical position of the focusing means 181 (focusing lens 183) changes by the difference between the upper surface height H1 and the upper surface height H2 of the wafer 1.

As described above, even when the upper surface height of the wafer 1 changes, the control means 61 can change the vertical position of the focal point C of the laser beam L according to this change in the upper surface height of the wafer 1. Accordingly, the focal point C can be set at the first vertical position P spaced a constant distance from the lower surface of the wafer 1, and a modified layer can be formed at this focal point C.

In this manner, the control means 61 performs the laser processing along the predetermined division line M. Thereafter, the control means 61 controls the indexing portion 20 to move the wafer 1 in the Y direction and then similarly performs the laser processing along the next division line M extending in the first direction.

As mentioned above, variations in the upper surface height of the wafer 1 are caused not only by variations in the upper surface height of the chuck table 43, but also by variations in the thickness of the adhesive tape S and variations in the thickness of the wafer 1. According to this preferred embodiment, regardless of such variations, a modified layer can be formed inside the wafer 1 at the constant vertical position from the lower surface of the wafer 1, so that the wafer 1 can be linearly divided. As a result, damage to the chips in dividing the wafer 1 can be suppressed.

In performing the laser processing along one division line M, the control means 61 may continuously perform the modified layer forming step and intermittently perform the upper surface height measuring step, the thickness measuring step, the lower surface height calculating step, and the correction value calculating step at predetermined time intervals.

While the control means 61 performs the upper surface height measuring step, the thickness measuring step, the lower surface height calculating step, and the correction value calculating step in performing the laser processing along all of the division lines M, the control means 61 may perform these steps at intervals of several division lines M, e.g., at intervals of two to three division lines M. This configuration is especially effective in the case that the size of each chip to be obtained by dividing the wafer 1 along each division line M is small.

Further, in performing the laser processing along one division line M, the control means 61 may continuously perform the upper surface height measuring step, the thickness measuring step, the lower surface height calculating step, the correction value calculating step, and the modified layer forming step.

As a modification, in performing the laser processing along one division line M, the control means 61 may first perform the upper surface height measuring step, the thickness measuring step, the lower surface height calculating step, and the correction value calculating step in advance to determine the vertical position of the focusing means 181 (the vertical position based on the upper surface height of the wafer 1) and the correction value according to the feed position and then store these values determined above. Thereafter, the control means 61 may next perform the modified layer forming step along this division line M by using these values stored above. In this case, in performing the modified layer forming step, the control means 61 sets the vertical position of the focusing means 181 (focusing lens 183) in the processing means 18, i.e., the vertical position of the focal point C of the laser beam L, by using the vertical position and the correction value previously obtained.

In this case, the feed speed in performing the upper surface height measuring step, the thickness measuring step, the lower surface height calculating step, and the correction value calculating step may be equal to or greater than the feed speed in performing the modified layer forming step.

For example, the feed speed in performing the modified layer forming step is in the range of 200 to 1000 mm/s. In the case that the wafer 1 is formed of GaAs, this feed speed is in the range of 200 to 300 mm/s. In the case that the wafer 1 is formed of Si, this feed speed is in the range of 600 to 1000 mm/s.

Second Preferred Embodiment

The laser processing operation of the laser processing apparatus 10 according to a second preferred embodiment will now be described. Also in the second preferred embodiment, under the control by the control means 61 in the laser processing apparatus 10, a laser beam having a transmission wavelength to the wafer 1 as a disk-shaped workpiece is applied to the wafer 1 in the condition where the focal point of the laser beam is set inside the wafer 1, and the laser beam is scanned along each division line M by feeding the wafer 1, thereby forming a modified layer inside the wafer 1 along each division line M.

Figure 5:
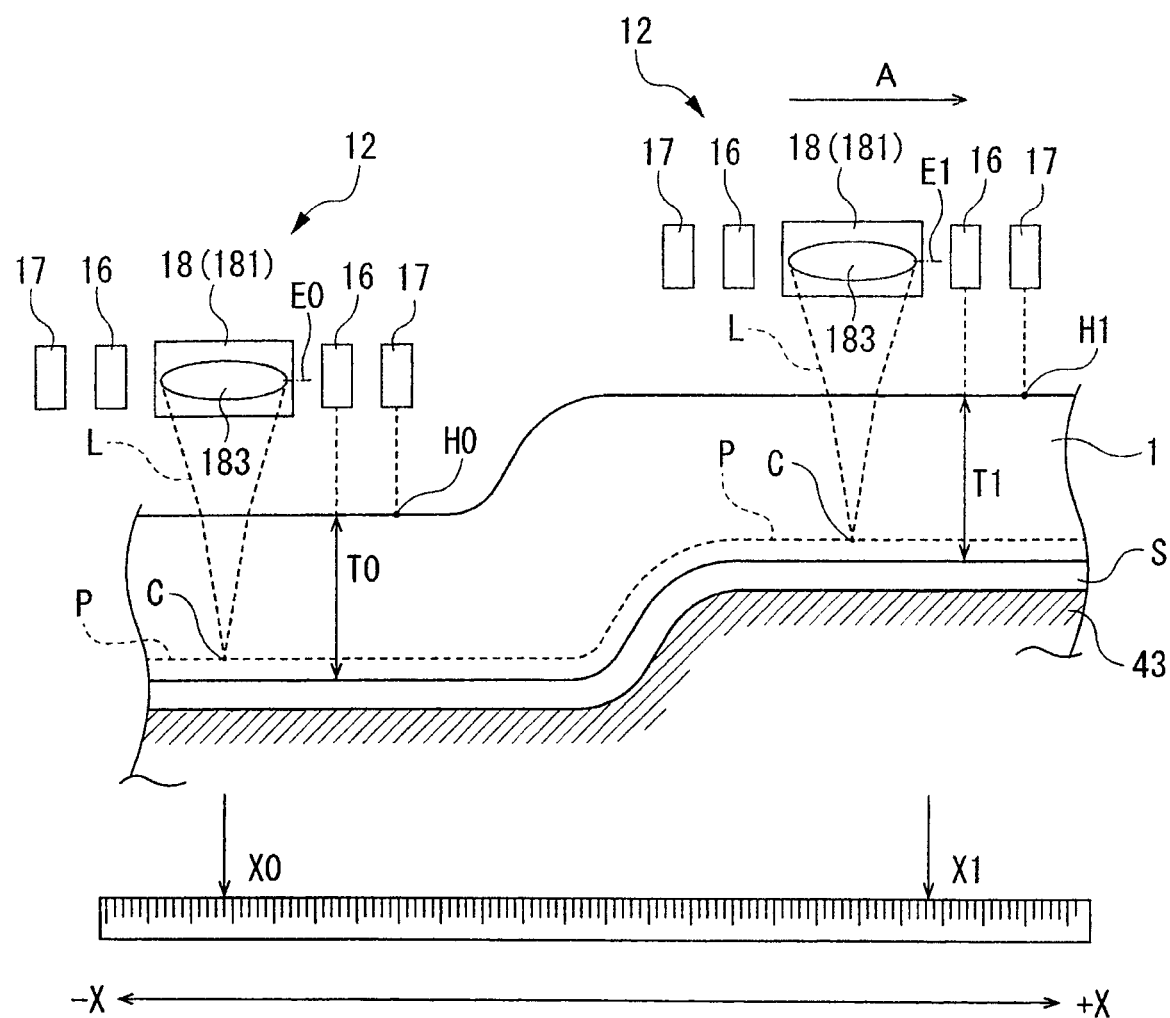
FIG. 5 is a schematic side view depicting another laser processing operation in the laser processing apparatus depicted in FIG. 1.
Figure 6:
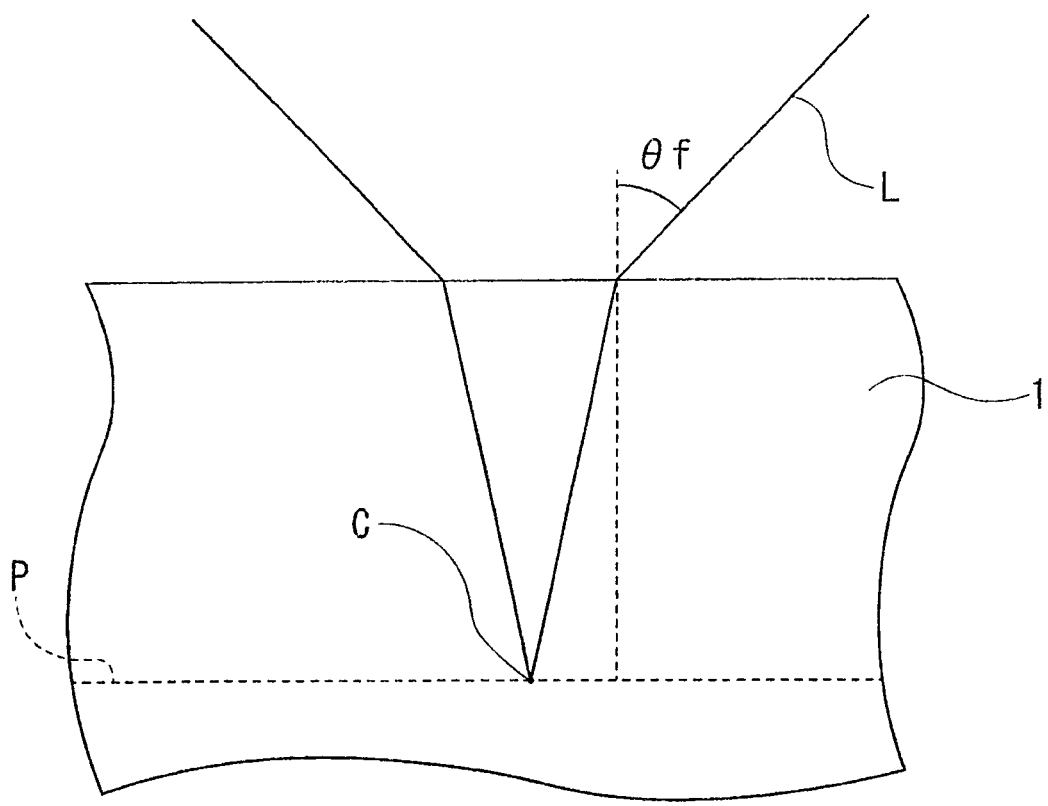
FIG. 6 is a schematic side view depicting an angle of incidence of a laser beam focused inside a wafer.

More specifically, the wafer 1 is first held on the chuck table 43 in a manner similar to that in the first preferred embodiment (holding step). Thereafter, the control means 61 performs alignment as similarly to the first preferred embodiment. Thereafter, as depicted in FIG. 5, the upper surface height of the wafer 1 at a predetermined reference feed position X0 is measured by the upper surface height measuring means 17 located on the downstream side of the processing means 18 in the scanning direction A, and this upper surface height measured above is stored as a reference upper surface height H0 into the storing portion 62 (reference upper surface height storing step).

Thereafter, the thickness of the wafer 1 at the reference feed position X0 is measured by the thickness measuring means 16 located on the downstream side of the processing means 18 in the scanning direction A, and this thickness measured above is stored as a reference height T0 into the storing portion 62 (reference thickness storing step).

Further, according to the reference upper surface height H0 and the reference thickness T0, the height of the focusing means 181 at the reference feed position X0 is calculated as a reference focusing means height E0 so that the focal point C is set at a first vertical position P spaced upward by a predetermined distance from the lower surface of the wafer 1 (reference focusing means height calculating step).

Thereafter, the laser unit 12 is relatively moved with respect to the wafer 1 in the X direction, and the laser beam is applied to the wafer 1 along each division line M to perform laser processing along each division line M, that is, to form a modified layer inside the wafer 1 along each division line M. At this time, the control means 61 performs a measuring step, a height difference calculating step, a thickness difference calculating step, an adjustment value calculating step, and a modified layer forming step in the following manner.

First, the control means 61 controls the feeding portion 30 to feed the wafer 1 in the X direction. Accordingly, as depicted by an arrow A in FIG. 5, the laser unit 12 is relatively moved in the +X direction with respect to the wafer 1 held on the chuck table 43. During the feeding of the wafer 1, there is a case that the upper surface height of the wafer 1 may change from the reference upper surface height H0 according to a change in feed position. For example, as depicted in a right portion of FIG. 5, there is a case that the upper surface height of the chuck table 43 at a feed position X1 may be increased to cause an increase in the upper surface height of the wafer 1.

Even in this case, the control means 61 can suitably adjust the height of the focusing means 181. More specifically, as depicted in FIG. 5, the control means 61 controls the upper surface height measuring means 17 and the thickness measuring means 16 located on the downstream side of the processing means 18 in the scanning direction A (in the +X direction), thereby measuring the upper surface height H1 and the thickness T1 of the wafer 1 (predetermined division line M) at the feed position X1 directly below this upper surface height measuring means 17 and this thickness measuring means 16 (measuring step).

Thereafter, the control means 61 subtracts the upper surface height H1 measured in the measuring step from the reference upper surface height H0 to calculate a height difference ΔH (height difference calculating step). Further, the control means 61 subtracts the thickness T1 measured in the measuring step from the reference thickness T to calculate a thickness difference ΔT (thickness difference calculating step).

Thereafter, the control means 61 uses the height difference ΔH, the thickness difference ΔT, and a parameter N to calculate an adjustment value for vertically adjusting the height of the focusing means 181 with respect to the reference focusing means height E0 so that the focal point C is set at the first vertical position P, from Equation (1) depicted below (adjustment value calculating step).

$$\text{Adjustment value} = \text{height difference } (\Delta H) - \text{thickness difference } (\Delta T) \times \text{parameter } (N) \quad (1)$$

where N is given by:

$$N = \tan[\arcsin\{(1/n) \times \sin \theta f\}]/\tan \theta f + \alpha,$$

in which n is the refractive index of the wafer 1, θf is the angle of incidence of the laser beam L focused by the focusing means 181 to enter the wafer 1, and α is a predetermined value according to the material of the wafer 1.

In this manner, the control means 61 calculates an adjustment value for the height of the focusing means 181 at the feed position X1 along the predetermined division line M. Thereafter, the control means 61 vertically moves the focusing means 181 from the reference focusing means height EU by a distance corresponding to this adjustment value calculated above, thereby adjusting the height of the focusing means 181 to a focusing means height E1. In this manner, the control means 61 adjusts the height of the focusing means 181 during the feeding of the wafer 1, and applies the laser beam L from the focusing means 181. Accordingly, a modified layer is formed inside the wafer 1 at the constant first vertical position P from the lower surface of the wafer 1 (modified layer forming step).

As described above, also in the method according to the second preferred embodiment, the control means 61 can adjust the height of the focusing means 181 according to a change in the upper surface height of the wafer 1. Accordingly, the focal point C can be set at the position P spaced a constant distance from the lower surface of the wafer 1.

Figure 7A:
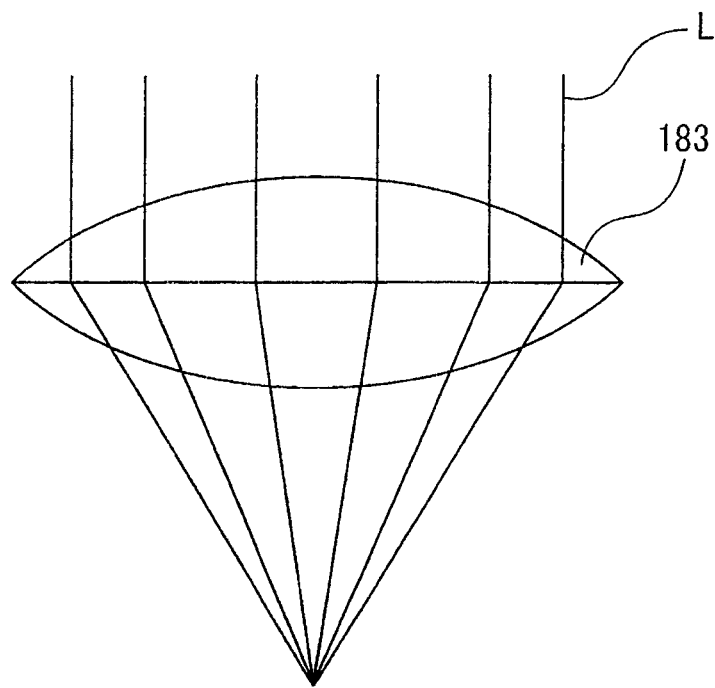
FIG. 7A is a schematic side view depicting a focal position of the laser beam passed through a focusing lens.
Figure 7B:
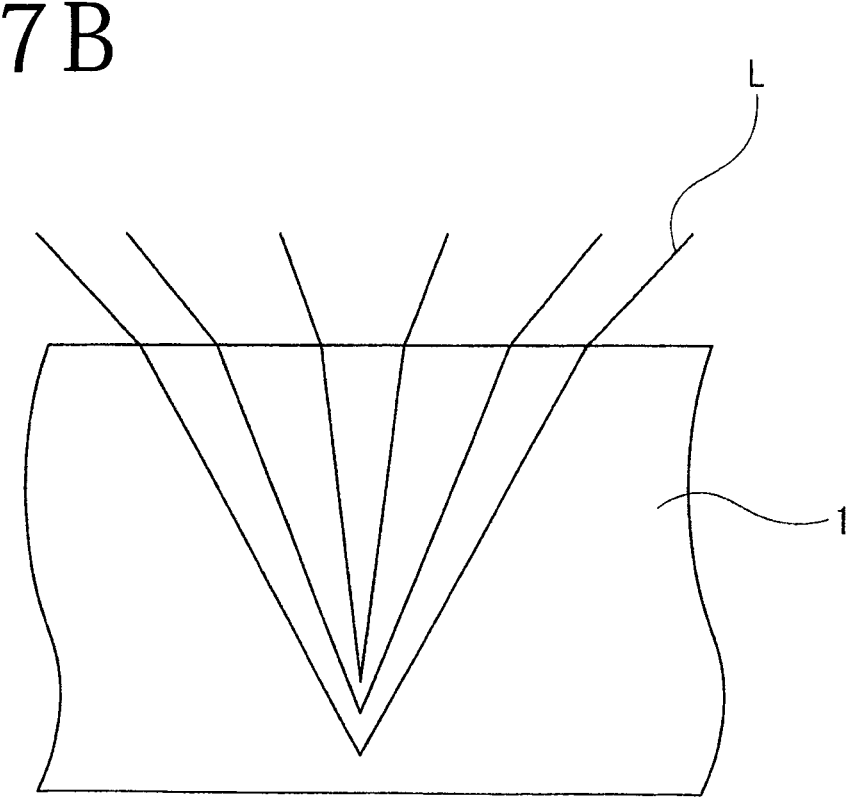
FIG. 7B is a schematic side view depicting a change in focal position inside the wafer according to a change in spherical aberration of the focusing lens.

The parameter (N) in Equation. (1) depicted above will now be described in more detail. As depicted in FIGS. 7A and 7B, due to the spherical aberration of the focusing lens 183, the focal position of the laser beam L passed through a radially outer portion of the focusing lens 183 becomes deeper in the wafer 1. Accordingly, in the case that the spherical aberration of the focusing lens 183 is large, the modified layer is formed at a vertical position near the lower surface of the wafer 1. Further, also in the case that the numerical aperture (NA) of the focusing lens 183 is large, the laser beam L is focused at a deep position in the wafer 1. Accordingly, the modified layer tends to be formed at a vertical position near the lower surface of the wafer 1.

The parameter (N) mentioned above is a value according to the spherical aberration and the numerical aperture (NA). Accordingly, it is considered that a suitable range of the parameter (N) is present for the formation of a modified layer at a substantially constant vertical position from the lower surface of the wafer 1. In this respect, the present inventor conducted a test for determining such a suitable range of the parameter (N) by using the wafer 1 formed of silicon.

Figure 8:
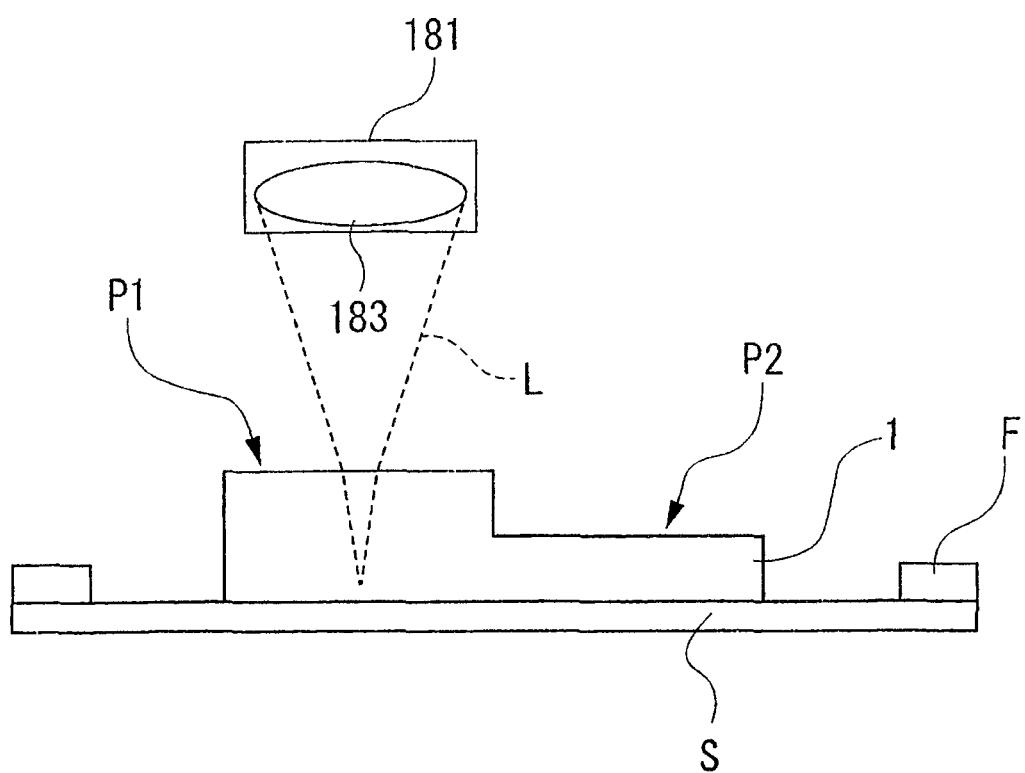
FIG. 8 is a schematic sectional side view depicting a test conducted to determine a suitable range of a parameter (N)

As depicted in FIG. 8, the wafer 1 used in this test has a portion P1 having a thickness of 100 μm and a portion P2 having a thickness of 90 μm. Further, the focusing lens 183 of the focusing means 181 used in this test has a numerical aperture (NA) of 0.7.

By using the method according to the second preferred embodiment, a modified layer was formed both in the portion P1 having a thickness of 100 μm and in the portion P2 having a thickness of 90 μm in the wafer 1 united with the ring frame F and the adhesive tape S. The formation of the modified layer was performed plural times by changing the height (Defocus: DF) of the focusing means 181 in the range of −14 to −22 μm and changing the value for the parameter (N) in the range of 0.1 to 0.2. Then, the distance from the lower surface of the wafer 1 to the lower end of the modified layer was measured. The results of this measurement are depicted in FIG. 9.

The sign attached to the value for DF is defined in such a manner that when the focal point of the laser beam focused by the focusing means 181 is set on the upper surface of the wafer 1, the height of the focusing means 181 is zero, and when the focusing means 181 is moved toward the wafer 1, the sign for DF is minus, whereas when the focusing means 181 is moved away from the wafer 1, the sign for DF is plus. In FIG. 9, the uppermost row in the table depicts values for sinθf when n=3.7. Further, in FIG. 9, the third row to the lowermost row in the table depict values (in μm) for the distance from the lower surface of the wafer 1 to the lower end of the modified layer according to various values for N and various values for DF, i.e., the height of the focusing means 181.

As depicted in FIG. 9, it is apparent that when N=0.10 to 0.17, there is a sufficiently small difference between the distance from the lower surface of the wafer 1 to the lower end of the modified layer in the portion P1 having a thickness of 100 μm (t=100) and the distance from the lower surface of the wafer 1 to the lower end of the modified layer in the portion P2 having a thickness of 90 μm (t=90). Accordingly, it can be the that the suitable range of the parameter (N) in this test is 0.10 to 0.17.

In this case, the adjustment value in the method according to the second preferred embodiment may be determined by using the following equation.

$$\text{Adjustment value} = \text{height difference } (\Delta H) - \text{thickness difference } (\Delta T) \times \text{parameter } (N) \quad (1)$$

where N=0.10 to 0.17.

The angle θf of incidence of the focused laser beam L has some range according to the position of each bundle of rays of the laser beam L. In this preferred embodiment, determination as to which bundle of rays of the laser beam L is to be adopted for the definition of the angle θf of incidence of the focused laser beam L is left to the operator, for example.

In the second preferred embodiment, it is preferable to set at least one reference point in each division line M in performing the reference thickness storing step, the reference upper surface height storing step, and the reference focusing means height storing step. In the case of setting a plurality of reference points, the reference thickness, the reference upper surface height, and the reference focusing means height may be first measured at each reference point, and the average of these values measured above may be next calculated, in which these average values for the reference thickness, the reference upper surface height, and the reference focusing means height may be used.

In performing the laser processing along one division line M, the control means 61 may continuously perform the modified layer forming step and intermittently perform the measuring step, the height difference calculating step, the thickness difference calculating step, and the adjustment value calculating step at predetermined time intervals.

While the control means 61 performs the measuring step, the height difference calculating step, the thickness difference calculating step, and the adjustment value calculating step in performing the laser processing along all of the division lines M, the control means 61 may perform these steps at intervals of several division lines M, e.g., at intervals of two or three division lines M. This configuration is especially effective in the case that the size of each chip to be obtained by dividing the wafer 1 along each division line M is small.

Further, in performing the laser processing along one division line M, the control means 61 may continuously perform the measuring step, the height difference calculating step, the thickness difference calculating step, the adjustment value calculating step, and the modified layer forming step.

As a modification, in performing the laser processing along one division line M, the control means 61 may first perform the measuring step, the height difference calculating step, the thickness difference calculating step, and the adjustment value calculating step in advance to determine the adjustment value for the vertical position of the focusing means 181 according to the feed position and then store the adjustment value determined above. Thereafter, the control means 61 may next perform the modified layer forming step along this division line M by using the adjustment value stored above. In this case, in performing the modified layer forming step, the control means 61 changes the vertical position of the focusing means 181 (focusing lens 183) in the processing means 18, i.e., the vertical position of the focal point C of the laser beam L, by using the adjustment value previously obtained.

In this case, the feed speed in performing the measuring step, the height difference calculating step, the thickness difference calculating step, and the adjustment value calculating step may be equal to or greater than the feed speed in performing the modified layer forming step.

In the laser processing apparatus 10 depicted in FIG. 1, the laser unit 12 includes the pair of thickness measuring means 16 and the pair of upper surface height measuring means 17 in addition to the processing means 18 so that the processing means 18 is interposed between the pair of thickness measuring means 16 and between the pair of upper surface height measuring means 17. Accordingly, both in the case of relatively moving the laser unit 12 with respect to the wafer 1 in the +X direction and in the case of relatively moving the laser unit 12 with respect to the wafer 1 in the −X direction, one of the two thickness measuring means 16 and one of the two upper surface height measuring means 17 can be located on the downstream side of the processing means 18 in the direction of the relative movement of the laser unit 12. Accordingly, irrespective of the direction of the relative movement of the laser unit 12, the control means 61 can measure the thickness and the upper surface height of the wafer 1 by using the thickness measuring means 16 and the upper surface height measuring means 17 located on the downstream side of the processing means 18.

Further, while the laser unit 12 in the laser processing apparatus 10 depicted in FIG. 1 includes the pair of thickness measuring means 16 and the pair of upper surface height measuring means 17, the laser unit 12 may include one thickness measuring means 16 and one upper surface height measuring means 17.

Further, in the laser processing apparatus 10 depicted in FIG. 1, the thickness measuring means 16 and the upper surface height measuring means 17 are configured as separate members. As a modification, a member having a function as the thickness measuring means 16 and a function as the upper surface height measuring means 17 may be included in the laser unit 12. That is, a single member capable of measuring the thickness of the wafer 1 and the upper surface height of the wafer 1 may be included in the laser unit 12 in place of the thickness measuring means 16 and the upper surface height measuring means 17.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing method of forming a modified layer inside a plate-shaped workpiece by applying a laser beam having a transmission wavelength to said workpiece in a condition where a focal point of said laser beam is set inside said workpiece and by relatively moving the focal point of said laser beam with respect to said workpiece along a division line preset on said workpiece, said laser processing method comprising:
   a holding step of holding said workpiece on a chuck table;
   an upper surface height measuring step of measuring a height of an upper surface of said workpiece held on said chuck table;
   a thickness measuring step of measuring a thickness of said workpiece held on said chuck table at a measurement position where said upper surface height measuring step is performed;
   a lower surface height calculating step of calculating a height of a lower surface of said workpiece held on said chuck table according to the height measured in said upper surface height measuring step and the thickness measured in said thickness measuring step;
   a correction value calculating step of setting a first vertical position spaced upward from the lower surface of said workpiece by a predetermined distance according to the height calculated in said lower surface height calculating step, next calculating a distance from said first vertical position to the upper surface of said workpiece, and next dividing the distance calculated above by a value obtained by adding a predetermined coefficient to a refractive index of said workpiece, thereby calculating a correction value for correcting a vertical position of focusing means for applying said laser beam so that said focal point is set at said first vertical position; and
   a modified layer forming step of feeding said workpiece and applying said laser beam from said focusing means as correcting the vertical position of said focusing means according to said correction value, thereby forming said modified layer along said division line at said first vertical position constant from the lower surface of said workpiece.

2. A laser processing method of forming a modified layer inside a plate-shaped workpiece by applying a laser beam having a transmission wavelength to said workpiece in a condition where a focal point of said laser beam is set inside said workpiece and by relatively moving the focal point of said laser beam with respect to said workpiece along a division line preset on said workpiece, said laser processing method comprising:

a holding step of holding said workpiece on a chuck table;

a reference upper height storing step of measuring a height of an upper surface of said workpiece held on said chuck table at a predetermined reference feed position by using upper surface height measuring means and next storing the height measured above as a reference upper surface height (H0);

a reference thickness storing step of measuring a thickness of said workpiece held on said chuck table at said reference feed position by using thickness measuring means and next storing the thickness measured above as a reference thickness (T0);

a reference focusing means height calculating step of calculating a height of focusing means for applying said laser beam as a reference focusing means height (E0) at said reference feed position according to the reference upper surface height (H0) stored in said reference upper height storing step and the reference thickness (T0) stored in said reference thickness storing step so that said focal point is set at a first vertical position spaced upward from the lower surface of said workpiece by a predetermined distance;

a measuring step of measuring the height (H) of the upper surface of said workpiece and the thickness (T) of said workpiece as relatively moving said upper surface height measuring means and said thickness measuring means with respect to said workpiece along said division line by using feeding means;

a height difference calculating step of subtracting said reference upper surface height (H0) from the height (H) measured in said measuring step to thereby calculate a height difference ($\Delta H$);

a thickness difference calculating step of subtracting said reference thickness (T0) from the thickness (T) measured in said measuring step to thereby calculate a thickness difference ($\Delta T$);

an adjustment value calculating step of using said height difference ($\Delta H$), said thickness difference ($\Delta T$), and a parameter (N) to calculate an adjustment value for vertically adjusting the height of said focusing means with respect to said reference focusing means height (E0) so that said focal point is set at said first vertical position, from Equation (1) depicted below; and a modified layer forming step of feeding said workpiece and applying said laser beam from said focusing means as vertically changing the height of said focusing means by a distance corresponding to said adjustment value, thereby forming said modified layer along said division line at said first vertical position constant from the lower surface of said workpiece;

said adjustment value being given by:

$$\text{said adjustment value} = \text{said height difference } (\Delta H) - \text{said thickness difference } (\Delta T) \times \text{said parameter } (N) \quad (1)$$

where N is given by, $$N = \tan[\arcsin\{(1/n) \times \sin \theta f\}]/\tan \theta f + \alpha, \text{ wherein}$$

n is the refractive index of said workpiece, $\theta f$ is an angle of incidence of said laser beam focused by said focusing means to enter said workpiece, and $\alpha$ is a predetermined value according to a material of said workpiece.

3. The laser processing method according to claim 2, wherein said measuring step, said height difference calculating step, said thickness difference calculating step, said adjustment value calculating step, and said modified layer forming step are continuously performed along said division line.

\* \* \* \* \*